Jan. 25, 1955   C. Q. BERNTSON   2,700,506
THERMOSTATICALLY CONTROLLED FLUID TEMPERING DEVICE
Filed Feb. 21, 1952   3 Sheets-Sheet 3

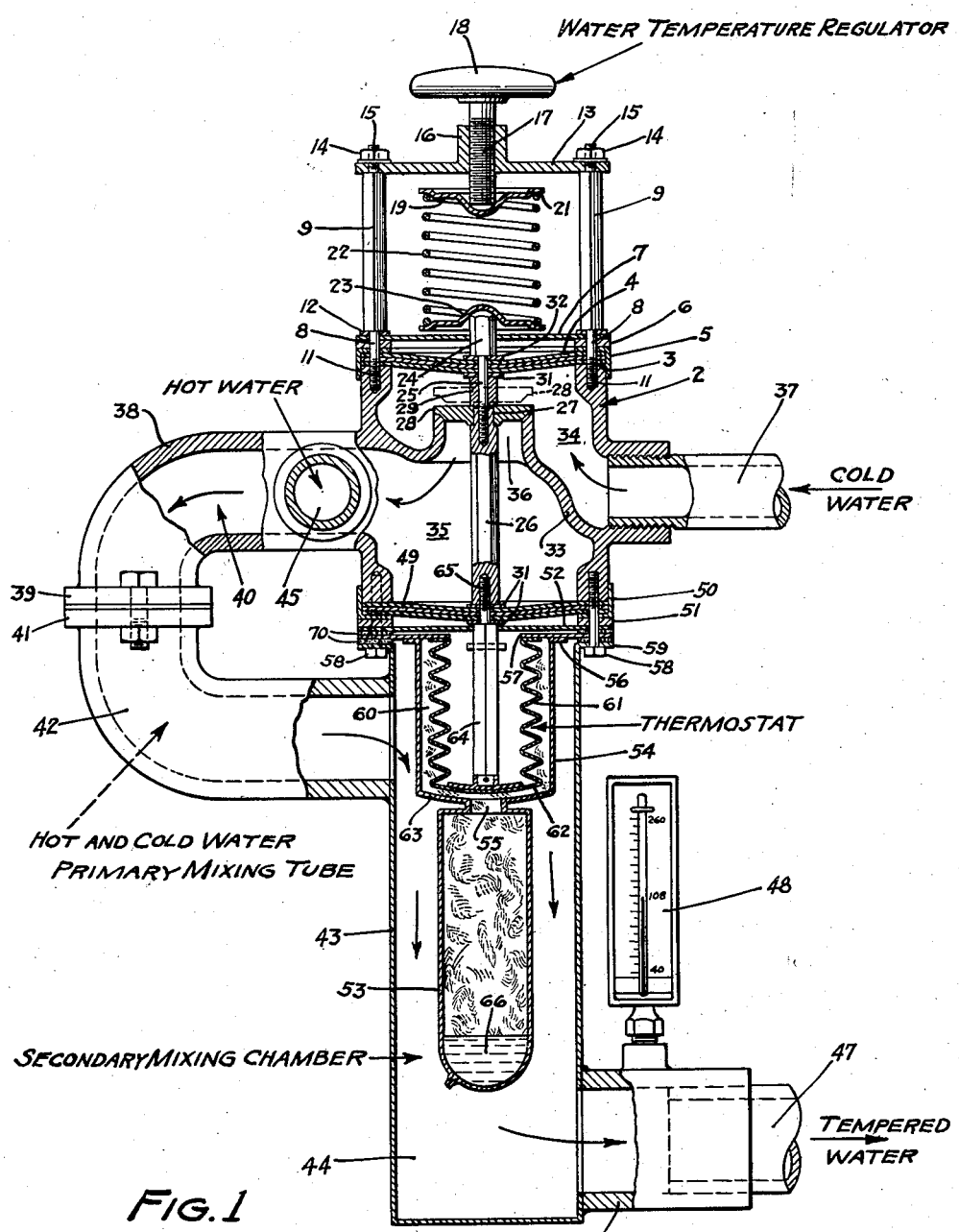

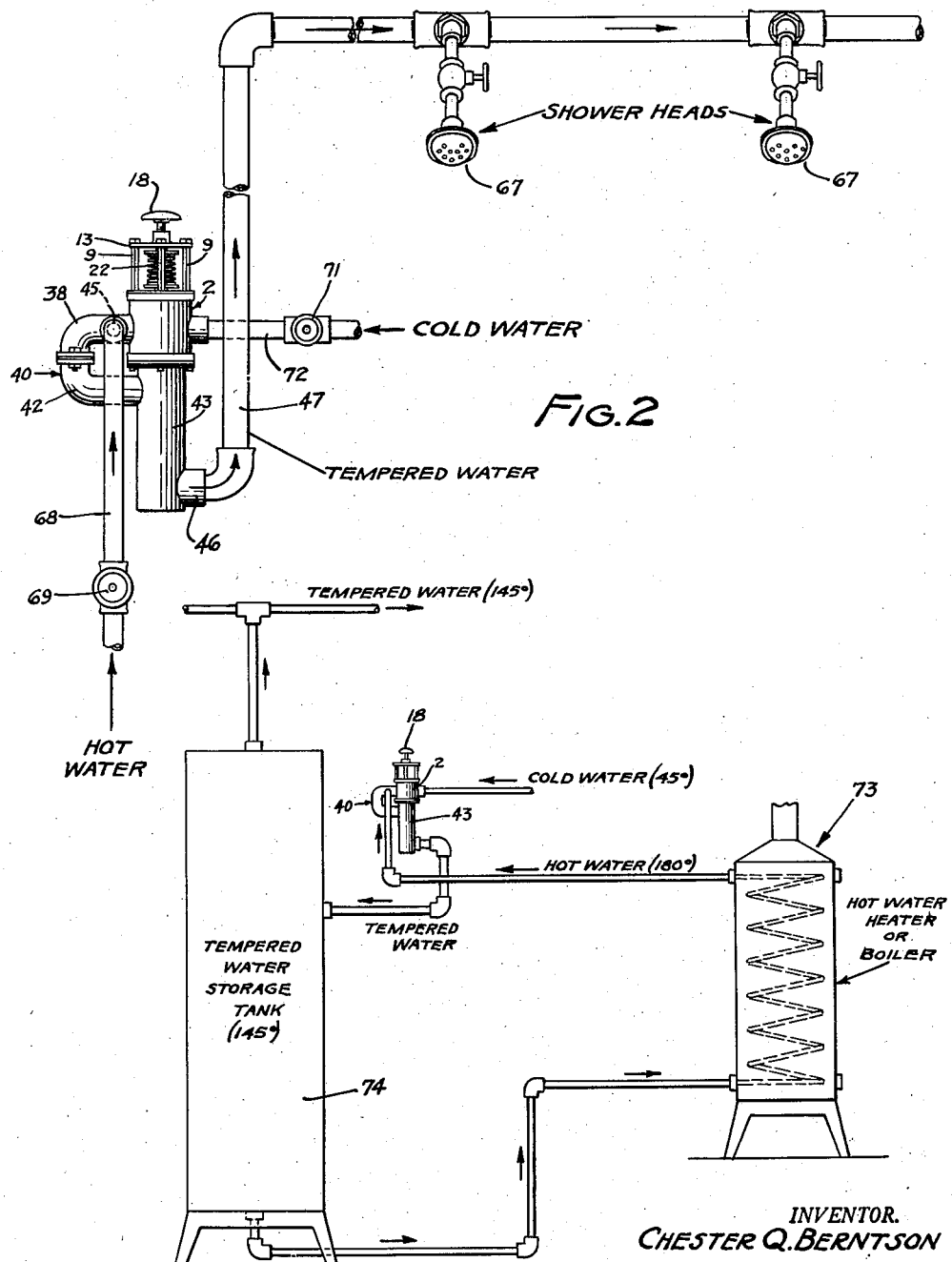

INVENTOR.
CHESTER Q. BERNTSON
BY Paul, Moore + Dugger
ATTORNEYS

United States Patent Office 2,700,506
Patented Jan. 25, 1955

2,700,506

THERMOSTATICALLY CONTROLLED FLUID TEMPERING DEVICE

Chester Q. Berntson, Redwood Falls, Minn., assignor of twenty per cent to Florence V. Watson, twelve and one-half per cent to Thoreen, Thoreen & Lawson, Stillwater, Minn., a partnership, and sixty-seven and one-half per cent to Roderick A. Lawson, Stillwater, Minn.

Application February 21, 1952, Serial No. 272,823

6 Claims. (Cl. 236—12)

This invention relates to new and useful improvements in fluid tempering devices, and more particularly to such a device adapted to be connected in a hot water supply system to automatically maintain the hot water delivered to the various service outlets of the system at a constant temperature.

There are now available various types of temperature regulating and control valves or devices adapted to be connected in a hot water supply system for regulating and controlling the supply of hot water thereto as, for example, a shower room which may comprise a plurality of shower heads, but to the best of my knowledge none of these have proven entirely satisfactory. One of the drawbacks to current devices of this general type is that they are not adequately sensitive to maintain the flow of tempered water at a predetermined constant temperature. In shower rooms employing a multiplicity of shower heads which are supplied with hot water received from a conventional water tempering control device, a marked variation in the temperature of the water discharging from the various sprayheads may sometimes be noted when some of the sprayheads are suddenly turned off, or in the event an additional number of sprayheads are turned on. Fluctuation of the water temperature at the sprayheads may also occur should hot water be drawn from the same source at some other point.

Under such conditions, the individuals taking showers may be called upon to frequently adjust the hot and cold water valves of the shower nozzles to maintain the water at the desired temperature. Such temperature fluctuation may be extremely unpleasant at times, particularly if the water from the sprayheads should suddenly or momentarily rise to a relatively higher temperature which may be too hot for comfort, or should the temperature of the water suddenly drop below body temperature.

The present invention is the result of considerable experimental and research work in an attempt to provide a fluid tempering device which is capable of maintaining the fluid discharging therefrom at a constant predetermined temperature, regardless of the respective temperatures of the high and low temperature fluids delivered thereto, whereby the device, when embodied in a hot water supply system, will insure accurate control of the temperature of the water supplied to the various service outlets or faucets of the system, regardless of the amount of hot water drawn therefrom provided, of course, that there is an adequate supply of hot water available at the source at all times.

An important object of the present invention therefore is to provide a water tempering device which is extremely simple in construction and positive in operation, and which is capable of maintaining the water discharging therefrom at a constant temperature regardless of the temperatures of the hot and cold water supplies delivered thereto, and means being embodied in said device for adjusting the temperature of the tempered water to adapt the device for use in different types of fluid or hot water systems which may require widely varying water temperatures.

A further object is to provide a water tempering unit or device comprising a primary mixing chamber having a connection with a supply of hot water, and means being provided for supplying controlled quantities of cold water to said primary mixing chamber including a thermostatically controlled valve adapted to be automatically actuated by a temperature responsive element located within a secondary mixing chamber through which the partially tempered water in the primary mixing chamber must flow to the service line, said temperature responsive element being located directly in the path of the partially tempered water entering the secondary mixing chamber, whereby should the temperature of the water delivered into the secondary chamber be slightly higher than the temperature required in the service line, said element is rendered operative to automatically open the cold water valve and permit additional cold water to enter the primary chamber, whereby the temperature of the water delivered to the secondary mixing chamber is lowered to the desired temperature required in the service line, and at which the tempering unit has previously been set.

A more specific object is to provide a water tempering device comprising a primary mixing chamber or tube, of generally U-shaped configuration, having a hot water supply pipe connected therewith and a thermostatically operated valve being mounted within the body of said unit which is normally closed to prevent the flow of cold water into the primary mixing chamber, said valve having a temperature responsive device connected thereto comprising a bellows-type element mounted within a suitable leaktight housing, the lower end of which is in communication with the upper end of an elongated tube having a suitable gaseous liquid therein which is highly responsive to temperature changes, said elongated tube being located within an elongated main housing providing a secondary mixing chamber through which the water must pass from the primary chamber to the service line, and whereby should the temperature of the water delivered into the secondary chamber suddenly become excessively hot, the gaseous fluid within said tube will expand and compress the bellows element in an axial direction and thereby automatically effect opening of the cold water valve to permit additional cold water to enter the primary mixing chamber and reduce the temperature of the water therein to that required in the service line.

A further object of the invention is to provide a water tempering unit which readily lends itself for use in various types of hot water systems to automatically maintain the supply of hot water delivered to the service fixtures of the system at substantially a constant temperature as, for example, in large shower rooms having a plurality of showerheads receiving hot water from a single service pipe or conduit; hot water heating systems for buildings, particularly radiant heating systems in which it is highly desirable that the temperature of the hot water supplied to the heating pipes or coils embedded in the walls of the building be maintained substantially constant to prevent damage to the building walls, and to effect maximum economy and comfort; and in hot water supply systems, in general.

Other objects of the invention reside in the unique construction of the tempering unit, per se, including the spaced diaphragms for supporting the valve stem whereby said valve stem is freely movable in an axial direction to open or close the cold water valve; in the means provided for varying the pressure exerted on the cold water valve to constantly urge it into closing engagement with its seat, and which means is readily adjustable to vary the pressure exerted on the valve to raise or lower the temperature of the tempered water discharging from the device to the service line; in the provision of a water tempering device which comprises but a single control valve which is adapted for automatic operation by a temperature responsive element located in the secondary mixing chamber of the device; in the provision of a gaseous fluid in the temperature responsive element which is of such a nature that when subjected to a given pressure, has its liquid and vapor phases in equilibrium at a temperature which is substantially less than that desired in the tempered water as, for example, "Freon 12" which is dichlorodifluoromethane; and in the specific construction of the temperature responsive element whereby the operation of the cold water valve is automatically controlled by temperature variations in the water entering the secondary mixing chamber.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a vertical sectional view of the tempering unit showing the control valve in closed position;

Figure 2 is a schematic view showing the water tempering device inter-connected in the hot and cold water supply pipes for tempering the water delivered;

Figure 4:
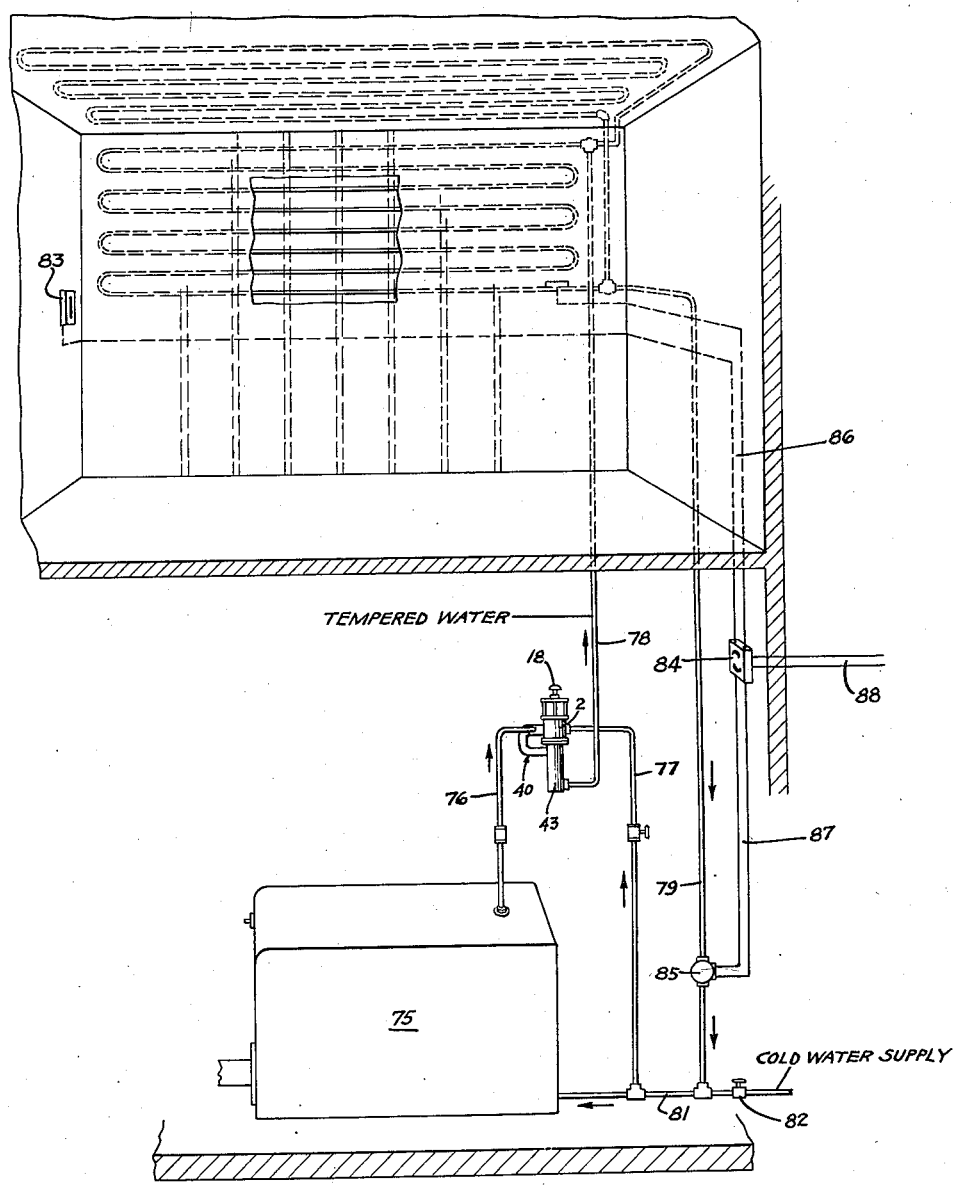

Figure 3 is a schematic view showing the water tempering unit connected to a hot water storage tank for controlling the temperature of the water delivered thereto; and Figure 4 is a schematic view showing the water tempering unit connected to the hot water supply pipe of a radiant heating system, whereby the supply of hot water delivered to the various heating coils thereof may be maintained at a constant temperature.

The novel tempering device or unit herein disclosed, is best illustrated in Figure 1, and is shown comprising a body 2, preferably of cast metal, having its upper end provided with a horizontal seat 3 upon which a multi-ply diaphragm 4 is seated. A retaining ring 5, preferably of angular cross-section, is shown fitted over the marginal edge of the diaphragm 4 and may have its cylindrical wall extending slightly downwardly over the upper end of the body 2. An annular spacing ring 6 is shown seated on the retaining ring 5 and supports a circular plate 7.

The parts 4, 5, 6 and 7 are apertured to receive the lower reduced end portions 8 of a plurality of studs 9, which preferably are hexagonal in cross-section whereby they may readily be grasped by a suitable wrench or instrument to secure the threaded terminals 11 thereof to the body 2 and thereby secure the diaphragm 4 in sealtight engagement therewith. If desired, suitable washers 12 may be seated between the lower ends of the studs 9 and the plate 7, as shown in Figure 1.

A backing plate 13 is secured to the upper ends of the studs 9 by nuts 14, received in threaded engagement with the reduced threaded terminals 15 of said studs. The plate 13 has a centrally disposed hub 16 which is threaded to receive the threaded stem 17 of an adjusting wheel or knob 18. The lower end of the stem 17 is shown seated in a recess provided in a circular disk 19 having an annular downwardly facing seat 21 adapted to engage the upper end of a spring 22, the lower end of which is seated upon a similar disk 23, supported upon the upper end of an elongated head 24 of a stud 25.

The lower end of the stud 25 is received in threaded engagement with the upper end of a valve stem 26, which preferably is hexagonal in cross-section. The valve stem has a reduced cylindrical portion 27 at its upper end adapted to receive a valve 28 which is fixedly secured to the stem 26. A spacing sleeve 29 is fitted onto the stud 25 and has its lower end engaging the valve 28 and its upper end a washer 31 between which and a similar washer 32, the central portion of the diaphragm 4 is clamped. Thus, when the head 24 of the stud 25 is rotated relatively to the valve stem 26, the diaphragm is fixedly secured to the valve stem 26 for axial movement therewith, as will subsequently be described.

A cross wall 33 is provided within the body 2 and divides said body into two chambers 34 and 35. A valve opening 36 is provided in the cross wall 33 which is normally closed by the valve 28, as a result of the spring 32 constantly exerting a downward pressure against the valve stem 26, as will readily be understood by reference to Figure 1. The chamber 34 is in constant communication with a cold water supply pipe or conduit 37 which is connected to the usual cold water supply of the building.

A tubular extension 38 is shown provided on one side of the body 2 and extends outwardly and downwardly therefrom and is shown provided with a coupling flange 39 at its lower end for securing it to a complemental coupling flange 41 of an upwardly disposed extension 42 having its inner end secured to the wall of an elongated cylindrical main housing 43. The extensions 38 and 42 cooperate to provide a U-shaped primary mixing chamber 40 which establishes communication between the chamber 35 and a secondary mixing chamber 44, defined by the walls of housing 43. A hot water intake 45 is provided in the upper extension 38 and is adapted to be in constant communication with a supply of hot water. The tubular extensions 38 and 42 are flanged as above described to facilitate assembling the device. In some instances they might be made integral.

The cylindrical housing 43 is shown having a lateral extension 46 at its lower end to which one end of a conduit 47 is connected for conducting the tempered water to service fixtures to be supplied. A suitable thermometer 48 may be mounted in the lower extension 46, as shown in Figure 1, for indicating the temperature of the tempered water flowing from the tempering unit or device to the service line 47. A diaphragm 49, similar to the diaphragm 4 at the upper end of the body 2, is shown seated against the lower end face of said body and has a retaining ring 50 fitted over the marginal edge portion thereof in a manner similar to the retaining ring 5 at the top end of the body 2. A spacing ring 51 is seated against the bottom face of the retaining ring 50, and a protecting plate 52 may be seated against the bottom side of ring 51.

One of the outstanding features of the present invention resides in the unique construction of the temperature responsive element provided within the secondary mixing chamber 44 for automatically effecting the opening and closing of the cold water valve 28 by temperature variations of the water flowing through the secondary chamber 44, during operation of the apparatus. This temperature responsive element is shown comprising an elongated tube 53 having its lower end sealed to the atmosphere and has its upper end in communication with the interior of a housing 54 through a restricted passage 55. The upper end of housing 54 is flanged, as shown at 56 to facilitate hermetically securing it to a horizontal wall member 57 secured in position below the plate 52 by a plurality of clamping screws 58, shown received in aligned apertures provided in the flange 59 of housing 43, and the parts interposed between said flange and the adjacent end of the body 2. Annular packing rings or washers 70 are seated against the opposed marginal edge portions of the wall member 57 to prevent water leakage from the secondary mixing chamber 44, as will be understood. The flange 56 of the housing 54 is secured to the wall member 57 in leaktight relation, by such means as soldering.

Mounted within the inner thermostatic housing 54 is a bellows-type element 61 which has its cylindrical bellows-like wall spaced from the corresponding wall of the housing 54. The bottom wall 62 of the element 61 is similarly spaced from the bottom wall 63 of the housing 54. The walls of the inner member 61 and the housing 54 thus cooperate to provide an annular gas chamber 60 which is in direct communication with the interior of the tube 53 through the restricted passage 55, as hereinbefore stated.

A stem 64 is mounted within the bellows-like element 61 and has its lower end secured to the bottom wall 62 thereof. The upper end of stem 64 is guidingly supported in an opening in the plate 52 and has a reduced end portion 65 received in threaded engagement with the lower end of the valve stem 26. The reduced end portion 65 of stem 64 passes through an opening in the diaphragm 49 and suitable clamping washers 31 are shown positioned against the upper and lower faces of the diaphragm and cooperate with the bottom end of the valve stem 26 and the upper end of the stem 64 to fixedly secured the valve stem to the diaphragm 49, as will be understood. By thus operatively connecting the valve stem 26 to the lower stem 64, when the lower stem is moved upwardly by axial compression of the bellows-like element 61, the valve 28 is moved out of engagement with its seat to permit additional cold water to flow from the cold water inlet 37 through chamber 34 and into the primary mixing chamber 40.

To assure instantaneous operation of the valve 28 at the slightest variation in the temperature of the water above that desired for the tempered water, a gaseous fluid or medium which, when subjected to a given pressure, has its liquid and vapor phases in equilibrium at a temperature which is substantially less than that desired in the tempered water, as, for example, Freon 12, dichlorodifluoromethane, is introduced into the tube 53, as indicated at 66 in Figure 1. Freon 12, dichlorodifluoromethane, has proven extremely effective as an actuating medium for the bellows-like element 61, because it is so highly responsive to temperature changes in the water passing through the secondary chamber. Under normal operating conditions, the Freon is in a semi-gaseous condition and fills the annular chamber 60 and the upper portion of the tube 53. Thus, it will be noted that the Freon gas within tube 53 and chamber 60 is in direct contact with the walls of said tube and the housing 54, whereby it is continually exposed to variations in the temperature of the water flowing into the secondary mixing chamber 44 from the primary mixing chamber or tube 40, as will readily be understood by reference to Figure 1.

Thus, should it be desired that the temperature of the water delivered to a service fixture or the sprayheads of a shower room be maintained at approximately one hundred and eight degrees (108°), then the adjusting wheel 18 at the top of the tempering device is gradually manipulated until the reading on the thermometer 48 indicates a water temperature of one hundred and eight degrees (108°). Thereafter the Freon gas within the tube 53 and chamber 60 will maintain the tempered water discharging from the secondary mixing chamber 44 to the service line 47 at the desired temperature, by intermittently causing the valve 28 to open and admit additional cold water into the primary mixing chamber from the cold water inlet 37, whenever the temperature of the water entering the secondary chamber momentarily rises above the desired temperature at which the device may be set, whereby the temperature of the water delivered to the service line 47 is maintained substantially constant at all times.

Should the temperature of the hot water delivered into the primary mixing chamber 40 from the hot water inlet 45 be extremely high and only a small quantity of hot water is drawn from the tempered water outlet 47, the gas in the tube 53 and the chamber 60 may maintain the valve 28 in a partially open position to permit sufficient cold water to continually enter the primary mixing chamber and intermix with the hot water delivered thereto to reduce the temperature of the tempered water to that desired at the service fixture as, for example, one hundred and eight degrees (108°).

The thermometer 48 makes it possible for the attendant to accurately vary the temperature of the tempered water at any time by simply manipulating the adjusting wheel 18 at the top of the tempering device. After such adjustment has been made, the water discharging from the secondary mixing chamber through its outlet 47 is maintained at the desired temperature, regardless of the respective temperatures of the hot and cold water delivered to the tempering device. It is to be understood that the primary mixing chamber is in constant communication with an adequate source of hot water supply, which must be sufficient to maintain the tempered water at the desired temperature.

The flow of cold water to the primary mixing chamber is controlled entirely by the thermostatic control means, including the element 61 and tube 53. Under normal operating conditions, particularly if a considerable quantity of hot water is being drawn from the service line 47, as when a plurality of sprayheads are being used, the cold water valve may be retained partially open most of the time in order to sufficiently cool the hot water flowing into the upper end of the secondary mixing chamber from the primary chamber to assure that the temperature of the water entering the service line 47 will correspond substantially to that desired at the service fixture.

In Figure 2, the tempering device is shown having its hot water supply pipe 47 leading to a plurality of shower heads 67. In this figure it will be noted, the hot water supply pipe 68 has a shut-off valve 69 therein whereby the flow of hot water to the tempering device may be completely cut off, if desired. In like manner, a shut-off valve 71 is shown provided in the cold water pipe 72. The novel water tempering device herein disclosed has been found extremely practical and efficient in multiple shower head installations, such as provided in the shower rooms of large institutions. In such places, there is always an adequate supply of hot water available, and by manipulation of the adjusting wheel 18 of the tempering unit or device, the temperature of the water flowing to the shower heads may be maintained substantially constant at all times regardless of the number of shower head utilized.

In Figure 3 the invention is shown embodied in a hot water supply system comprising a water heater, generally designated by the numeral 73, and a hot water storage tank 74. When so utilized, it may be adjusted to maintain the temperature of the water in the storage tank 74 at any desired figure as, for example, one hundred forty-five degrees (145°), as indicated on the drawing. In such an installation, hot water may be supplied to the tempering device from the water heater 73 at a temperature of approximately one hundred eighty degrees (180°), and the temperature of the cold water delivered thereto may be approximately forty-five degrees (45°). By proper manipulation of the adjusting knob 18 of the apparatus, the hot and cold water delivered to the tempering unit are so intermixed therein that the tempered water flowing from the tempering device to the storage tank may be maintained at any desired temperature, controlled by the setting of the adjusting knob 18.

In Figure 4 the water tempering unit or device is shown embodied in the hot water system of a building. In such systems, particularly radiant heating systems, it is desirable that the hot water delivered to the usual heating coils of the system from the boiler 75 be maintained below a maximum high temperature to prevent damage to the building walls from excessive heat. When employed in such an installation, the hot water flows from the boiler 75 through the hot water pipe 76 to the primary mixing chamber 40 of the water tempering device. Simultaneously, cold water is delivered to the primary chamber from the cold water pipe 77 provided, of course, that the valve 28 is open. The hot and cold water thus entering the primary chamber is partially intermixed therein, and thence flows into the secondary chamber.

Should the temperature of the water delivered into the secondary chamber exceed that at which the tempering unit may be set as, for example, one hundred sixty degrees (160°), the thermostatic means (53–60–61–66) in the secondary chamber functions to automatically open the cold water valve and admit additional cold water into the primary chamber in sufficient quantity to lower the temperature of the water to that desired in the heating coils, thus assuring that the temperature of the water flowing through the heating system will not exceed one hundred sixty degrees (160°). In radiant heating systems the heating coils are usually concealed within the walls of the building, as indicated in Figure 4 and the return flow of water from said coils may be through a return pipe 79, shown connected to a cold water supply pipe 81. The cold water pipe 81 is shown having a shut-off valve 82 therein, and has one end connected to the boiler for supplying water thereto, as is well known in the art.

In Figure 4 there is also indicated a conventional room thermostat 83, a combined transformer and relay 84, and a water circulating pump 85. The thermostat 83 and pump 85 are shown electrically connected to the relay 84 by circuits 86 and 87, respectively. Electric power for operating the relay and circulating pump 85 may be obtained from a power line 88.

From the foregoing, it will be noted that the novel fluid tempering device or unit herein disclosed readily lends itself for use in various types of installations requiring that the supply of hot water thereto be maintained at substantially a constant temperature. The temperature of the tempered water or fluid may readily be varied at any time by manipulation of the adjusting member 18, whereby the device may be utilized for supplying hot water at any desired temperature, assuming, of course, that the temperature of the hot water supplied to the primary mixing chamber 40 always exceeds the desired temperature of the tempered water drawn from the tempering unit.

I claim as my invention:

1. A fluid tempering device comprising a hollow body, a diaphragm secured to each end of said body to provide flexible end walls therefor, said body having a cold water inlet, a primary mixing chamber in communication with said body and having a hot water inlet, means providing a secondary mixing chamber for receiving partially tempered water from the primary mixing chamber, said secondary mixing chamber means being spaced from and supported by said hollow body, a normally closed valve in said body for controlling the flow of cold water to the primary mixing chamber, said valve having a valve stem secured to said diaphragms whereby the diaphragms support the valve for axial movement within said body, spring means constantly urging the valve into closing position, and temperature responsive means wholly enclosed within said secondary chamber means, said temperature responsive means being free from contact with the cold water in said hollow body and operably responsive only to temperature variations of the water in said secondary chamber means, and connector means secured to said temperature responsive means and said valve for automatically opening said valve to admit cold water into the primary chamber, should the temperature of the water entering the secondary chamber from the primary chamber exceed the desired temperature of the tempered water.

2. A fluid tempering device according to claim 1, wherein said temperature responsive means includes an axially collapsible element and an elongated tube having a vaporizable temperature responsive fluid, the vapors of which, when subjected to a given temperature, will expand and compress said collapsible member to effect momentary opening of the cold water valve.

3. A water tempering device comprising a hollow body having a partition therein dividing it into first and second chambers, a cold water inlet for said first chamber, a valve in said partition, spring means constantly urging said valve into closed position, an elongated main housing having its top end secured to the bottom end of said body and having an outlet at its lower end for the discharge of tempered water, a connection between said second chamber and the upper portion of said main housing, a hot water inlet for introducing hot water or steam into said connection adjacent to said second chamber, thereby to intermix with the cold water flowing through said connection from said second chamber, said connection serving as a primary mixing chamber for the hot and cold waters, and said elongated main housing providing a secondary mixing chamber therefor, temperature responsive means wholly supported within said elongated main housing and free from contact with the cold water in said hollow body, said temperature responsive means comprising an inner, relatively smaller housing having its upper end secured to the upper wall of said main housing in fixed sealed relation thereto, said inner housing depending into said main housing and having its cylindrical wall spaced from the corresponding wall of said main housing to provide an annular water-circulating passage therebetween, and whereby the partially tempered water delivered into said main housing from said connection is directed against the cylindrical wall of said inner housing, and thence flows downwardly through said main housing to the discharge opening at the lower end thereof, a pressure responsive element within said inner housing having an operating connection with said valve, an elongated sealed tube having its upper end secured to the bottom end of said inner housing and extending downwardly into said main housing the major portion of its length, means providing a fluid conducting passage between the interior of said inner housing and said tube, and a vaporizable temperature responsive fluid within said tube and inner housing having the inherent characteristics of quickly vaporizing and condensing in response to slight variations in the temperature of the water delivered into said secondary mixing chamber from said connection, thereby to automatically effect actuation of said valve to control the delivery of cold water into the secondary chamber from said connection in direct proportion to the demand for tempered water from said device.

4. A water tempering device comprising a hollow body having means for supplying cold and hot water thereto, a tubular U-shaped member having one end in communication with the interior of said body and forming a primary mixing chamber, a main housing secured to one end of said body in sealed relation thereto, said U-shaped tubular member having its discharge end in communication with the interior of one end of said main housing, said main housing providing a secondary mixing chamber having an outlet at its opposite end for the tempered water, a single valve in said body for controlling the flow of cold water to the primary mixing chamber, and temperature responsive means wholly enclosed within the secondary chamber for automatically actuating said valve by variations in the temperature of the water flowing into the secondary chamber from the primary chamber, said temperature responsive means comprising a bellows element having one end secured to a fixed member and having its opposite end adapted for relative axial movement, said bellows being spaced from said hollow body and free from contact with the cold water flowing in said hollow body, said valve having a stem extending into said bellows element and secured to the movable end wall thereof, a relatively smaller housing within said main housing and completely enclosing said element, the lower portion of said main housing one end in an elongated tube in communication with the movable end of said inner housing and having a vaporizable temperature responsive fluid therein, and said smaller housing and tube having their walls spaced from the wall of said main housing whereby only the water discharging from the primary chamber into said secondary chamber may impinge against the walls of said smaller housing and tube, whereby should the temperature of the water delivered into said secondary chamber exceed that desired in the tempered water, vapors of said vaporizable temperature responsive fluid in said tube will quickly expand and compress the element and thereby open the valve and admit additional cold water into the primary chamber to lower the temperature thereof to that desired in the tempered water.

5. A water tempering device in accordance with claim 4, wherein the opposed end walls of said hollow body constitute flexible diaphragm to which the valve stem is secured, and whereby said diaphragms axially guide the valve in its opening and closing movements within the housing.

6. A water tempering device according to claim 4, wherein one end of a coil spring is operatively engaged with the upper end of the valve stem and an adjusting element is operatively connected to the opposite end of said spring for varying the tension therein, thereby to vary the temperature of the tempered water.

References Cited in the file of this patent

UNITED STATES PATENTS

| | | |
|---|---|---|
| 1,076,293 | Lawler | Oct. 21, 1913 |
| 1,873,769 | Lang | Aug. 23, 1932 |
| 1,942,270 | Resek | Jan. 2, 1934 |
| 2,106,929 | McClure | Feb. 1, 1938 |
| 2,141,520 | Dube | Dec. 27, 1938 |

OTHER REFERENCES

Bridgeport, Chart of "Vapor Pressure-Temperature Relationships of Charging Liquids" following page 26 of Bulletin No. 100 of the Bridgeport Thermostat Company, Bridgeport, Connecticut.